April 1, 1952 G. F. KUHN 2,590,980
APPARATUS FOR THE CATALYTIC CONVERSION OF HYDROCARBONS
Filed June 21, 1947
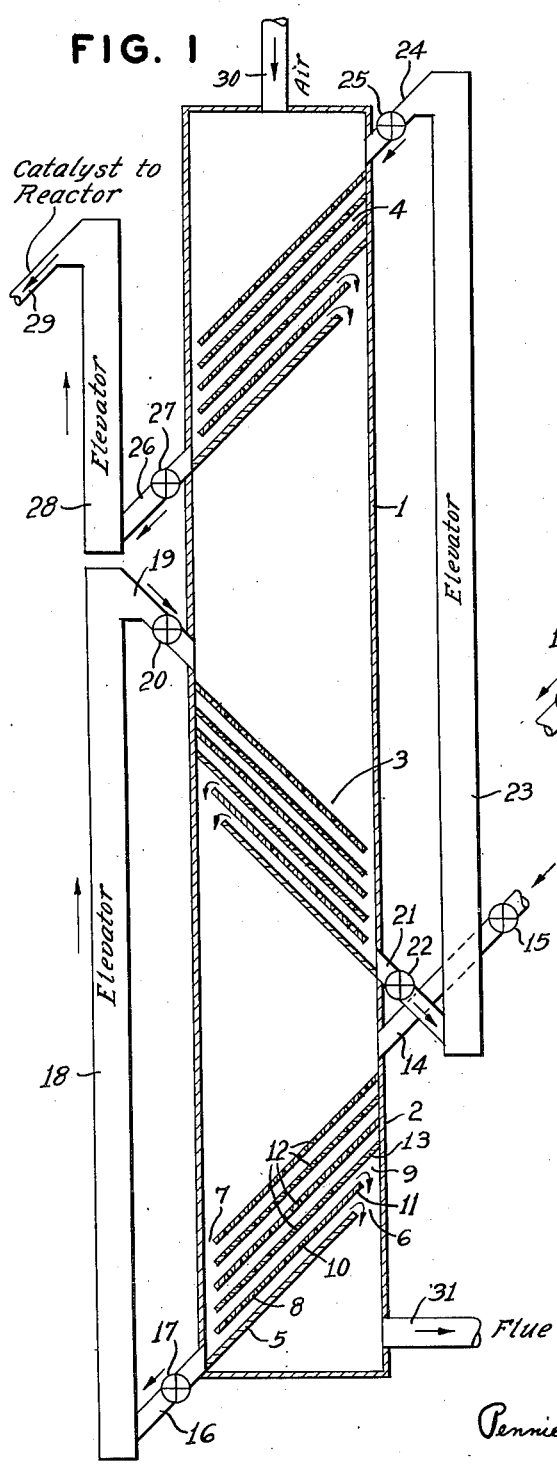
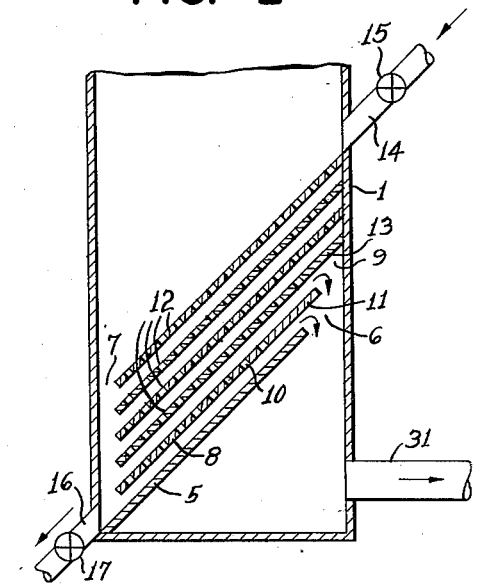
INVENTOR.
George F. Kuhn
BY
Pennie, Edmonds, Morton & Barrows.
ATTORNEYS Patented Apr. 1, 1952

2,590,980

UNITED STATES PATENT OFFICE 2,590,980

APPARATUS FOR THE CATALYTIC CONVERSION OF HYDROCARBONS

George F. Kuhn, Sinclair, Wyo., assignor to Sinclair Refining Company, New York, N. Y., a corporation of Maine Application June 21, 1947, Serial No. 756,292

3 Claims. (Cl. 23—288)

This invention relates to pyrolytic conversion of hydrocarbons and more particularly to apparatus for pyrolytic conversion processes involving the use of catalysts.

In the conversion of hydrocarbon base stocks to produce products having desired properties, such as high octane number for use in gasoline, the stock is submitted to one of several processes, such as cracking, hydrogenation, dehydrogenation, etc., in the presence of a catalyst.

The present invention is directed to means for regenerating catalyst in the form of beads or pellets or other relatively coarse particles. The regenerator employed is basically of the kiln type and is constructed to provide counter-current flow of catalyst and air. It may consist of one or more regenerating zones with means for conveying the catalyst from the outlet end of one zone to the inlet end of the next zone. The catalyst, therefore, flows through the zones of the regenerator in series. Each zone comprises a series of distributors extending across the regenerator or kiln at an angle to cause flow of the catalyst from the inlet to the outlet. These distributors are provided with openings through which the catalyst and air may pass. The catalyst is collected at the bottom of the distributors at the outlet end of each zone and carried by suitable elevator to the top or inlet of the next regenerating zone. The distributors are arranged to permit passage of air from one zone to the next so that air entering the regenerator or kiln at the top flows through each of the zones of the regenerator and the flue gases are exhausted at the bottom.

In operation according to the invention, air is delivered to the top of the kiln and the spent catalyst delivered to the bottom regenerating zone. After passing through one zone, the catalyst is conveyed to the next until it reaches the top whence it is conveyed to the reactor in which it is to be used. The set of plates forming each distributor are perforated, with the exception of the lower plate, so that the catalyst particles flow downwardly from the inlet to the outlet, some of the catalyst particles passing through the perforations in the distributor plates and all of the catalyst collecting at the outlet end of the zone. At the inlet or high side of each series of distributor plates, one or more plates terminate at a distance from the kiln leaving a space through which the air may flow to the next zone of the regenerator.

In the accompanying drawings I have shown, in Figure 1, more or less diagrammatically, a vertical, sectional view of apparatus suitable for use in practicing the process and forming a part of the invention. Figure 2 is a fragmentary, somewhat enlarged, sectional view of the lower set of inclined plates.

Referring to the drawings, the reference numeral 1 designates generally a kiln or chamber which forms the regenerator. It may be built of any suitable material which will withstand the heat created in the regeneration of the catalyst and may be of any desired size depending upon the number of regenerating zones into which it is divided. For the purpose of illustration I have shown a regenerator having three zones 2, 3 and 4. As the construction of the series of distributing plates forming a zone of the regenerator is the same in all instances, a description of one set will suffice.

Each set of distributors consists of a plurality of plates extending from one side of the regenerator to the other and arranged at such an angle that the catalyst particles will flow downwardly across them. The plates are also spaced from each other a distance slightly greater than the size of the catalyst particles to permit catalyst particles to pass between them. The lower plate 5 of each set extends from the wall at the outlet side or end of the casing, which is at the lower side or end of the distributor and terminates a slight distance from the opposite wall leaving a space 6 for the passage of air. This plate is imperforate. All of the other plates of the series terminate a slight distance from the wall at the outlet side or end to provide a space through which catalyst particles may pass to the outlet. This space is indicated at 7. The plate 8 immediately above the lower plate 5 also terminates a slight distance from the wall at the inlet side providing a space 9 for passage of air. This plate is perforated throughout a portion of its length as indicated at 10 but is provided with an imperforate portion 11 which extends from its upper end to the point beyond the space 6 to prevent any catalyst particles from passing through the air space 6. The remaining plates of the series, of which there may be any desired number, are identified by the reference numeral 12, and these plates extend to the wall on the inlet side. These plates are perforated throughout, except the lower one, which is provided with an imperforate portion 13 extending from the wall on the inlet side to a point beyond the space 9 to prevent catalyst from passing through the space 9.

The spent catalyst is conveyed to the inlet of the regenerating zone 2 through a pipe or conduit 14 having a valve 15 therein. At the outlet of the regenerating zone 2 the catalyst passes through a pipe or conduit 16 having a valve 17 therein. It is then conveyed by elevator 18 to a pipe or conduit 19 arranged at the inlet of regenerating zone 3 and having a valve 20 therein. A similar pipe or conduit 21, having a valve 22 therein, extends from the outlet of regenerating zone 3 to an elevator 23. This elevator in turn communicates with a pipe or conduit 24 having a valve 25 therein communicating with the inlet of regenerating zone 4. The outlet end of regenerating zone 4 communicates with a pipe 26 having a valve 27 therein. This pipe in turn communicates with an elevator 28 through which the regenerated catalyst is delivered to a pipe or conveyor 29 for return to the reactor. The regenerator is provided with an air inlet 30 at the top and an exhaust 31 for flue gases at the bottom.

In operation according to the invention, the spent catalyst is delivered to the first regenerating zone through pipe 14. It will be noted that the pipes 14, 16, 19, 21, 24 and 26 are arranged at substantially the same angle as the distributor plates 5, 8 and 12, which is an angle at which the particles of the catalyst will flow. The catalyst flows over the top distributing plate and part of it passes through the openings in this plate. Likewise, part of the catalyst flowing over each of the plates passes through the openings in it, with the exception of course of the bottom plate 5 which is imperforate. The space 7 between the ends of all of the plates except the bottom plate and the wall of the kiln at the outlet side assures delivery of the catalyst particles to the outlet conduits 16, 21 and 26. The extension of all of the plates to the wall at the inlet side, with the exception of the two bottom plates 5 and 8 and the provision of imperforate portions 11 and 13 in the two plates over the openings 6 and 9, prevents any of the catalyst from passing through the distributor plates from one regenerating zone to the next.

Air entering at 30 flows downwardly and also passes through the perforations in the upper plates of the distributor. Except when the valves 17, 22 or 27 are open, the air can pass from each regenerating zone only by passing through the spaces 6 and 9, as indicated by the arrows. This causes the air to flow upwardly over the plates toward the openings 6 and 9 in counter-current flow to the catalyst particles. As in any conventional regenerating process, the air removes the carbonaceous material from the catalyst particles by burning and the flue gases produced are exhausted through pipe 31.

I claim:

1. Apparatus of the character described comprising a regenerating chamber, a series of spaced, inclined, substantially parallel, perforated plates extending downwardly from one wall of the chamber to just short of the opposite wall at their lower ends, a further plate which is imperforate positioned beneath and substantially parallel to the series of perforated plates extending upwardly from an opposite wall to just short of the first said wall, a further plate positioned parallel to and between the lowermost perforated plate and the imperforate plate, the further plate being perforated over its lower portion and imperforate over its upper portion and substantially coextensive at its lower end with the perforated plates and extending at its imperforate end beyond the upper end of the imperforate plate but short of the adjacent wall, an inlet for introducing solid granular catalyst to the upper end of the upper perforated plate, an outlet for withdrawing catalyst from the lower end of the imperforate plate and means for passing air through the chamber.

2. Apparatus in accordance with claim 1 in which a plurality of sets of the parallel plates are positioned in vertically spaced zones of the chamber, conveyor means are provided for conveying the catalyst from the catalyst outlet from a lower set to the catalyst inlet of the next higher set of plates and conduit connections are provided for passing air downwardly through the chamber.

3. Apparatus of the character described comprising a regenerating chamber, a series of spaced, inclined, substantially parallel, perforated plates extending downwardly from one wall of the chamber to just short of the opposite wall at their lower ends, and so constructed and arranged as to provide parallel, substantially unobstructed zones of substantially uniform transverse area between the respective perforated plates, a further plate which is imperforate positioned beneath and substantially parallel to the series of perforated plates extending upwardly from said opposite wall to just short of the first said wall, an inlet for introducing solid granular catalyst to the upper end of the upper perforated plate, an outlet for withdrawing catalyst from the lower end of the imperforate plate and means for passing air through the chamber.

GEORGE F. KUHN.

REFERENCES CITED

The following references are of record in the file of this patent:

UNITED STATES PATENTS

| Number | Name | Date |
|---|---|---|
| 1,225,403 | Borislavsky | May 8, 1917 |
| 2,316,664 | Brassert et al. | Apr. 13, 1943 |
| 2,376,564 | Upham et al. | May 22, 1945 |
| 2,416,214 | Payne | Feb. 18, 1947 |
| 2,444,128 | Anderson | June 29, 1948 |
| 2,444,990 | Hemminger | July 13, 1948 |
| 2,488,493 | Evans | Nov. 15, 1949 |